United States Patent
Jones et al.

(10) Patent No.: US 9,557,987 B2
(45) Date of Patent: Jan. 31, 2017

(54) AUTOMATIC FORMATTING OF COMPUTER PROGRAM SOURCE CODE

(75) Inventors: Gareth Edward Jones, Winchester (GB); Andrew John Owen, South Hampton (GB); Matthew Whitehead, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 2858 days.

(21) Appl. No.: 12/025,987

(22) Filed: Feb. 5, 2008

(65) Prior Publication Data

US 2008/0229290 A1    Sep. 18, 2008

(30) Foreign Application Priority Data

Mar. 14, 2007  (EP) ................... 07104109.9

(51) Int. Cl.
*G06F 17/00* (2006.01)
*G06F 9/44* (2006.01)
(Continued)

(52) U.S. Cl.
CPC . *G06F 8/71* (2013.01); *G06F 8/33* (2013.01); *G06F 8/70* (2013.01); *G06F 11/3676* (2013.01); *G06F 8/51* (2013.01); *G06F 8/77* (2013.01)

(58) Field of Classification Search
CPC  G06F 9/546; G06F 17/2827; G06F 17/30905; G06F 9/45516; G06F 11/3676; G06F 17/5045; G06F 17/30371; G06F 17/227; G06F 17/2247; G06F 17/50; G06F 17/271; G06F 8/51; G06F 8/30; G06F 8/425; G06F 8/355; G06F 8/72; G06F 8/71;G06F 8/447; G06F 8/70; G06F 8/77; G06F 8/33; G06F 8/20
See application file for complete search history.

(56) References Cited

U.S. PATENT DOCUMENTS 4,819,233 A * 4/1989 Delucia et al. ............... 717/129
5,868,576 A * 2/1999 Maruta ................. G06F 17/271
434/118

(Continued)

OTHER PUBLICATIONS

Annie T.T. Ying et al., Predicting Source Code Changes by Mining Change History, IEEE Sep. 2004, [Retrieved on Jan. 25, 2016]. Retrieved from the internet: <URL: http://ieeexplore.ieee.org/stamp/stamp.jsp?tp=&arnumber=1324645> 13 Pages (574-586).*

(Continued)

*Primary Examiner* — Thuy Dao
*Assistant Examiner* — Anibal Rivera
(74) *Attorney, Agent, or Firm* — Yee & Associates, P.C.; Stephen Yoder

(57) ABSTRACT

A method and system is provided for auto formatting changes to computer program source code stored in a code repository. The code comprises a plurality of separately identifiable sections each of which includes non-functional formatting information which differs between at least some of the sections. In response to a user input request a selected source code section is extracted and edited via a user interface. A set of formatting rules is determined automatically from at least the code section being edited. This set of rules is one of a plurality of possible sets corresponding to the separately identifiable sections. The edited code is then formatted according to the determined set of formatting rules and stored in the code repository.

19 Claims, 4 Drawing Sheets

(51) Int. Cl.
   *G06F 11/36*   (2006.01)
   *G06F 9/45*   (2006.01)

(56) References Cited

U.S. PATENT DOCUMENTS

| | | | | |
|---|---|---|---|---|
| 6,269,367 | B1* | 7/2001 | Travis et al. | 707/999.006 |
| 6,698,014 | B1* | 2/2004 | Rechter | G06F 8/51 |
| | | | | 717/137 |
| 6,802,057 | B1* | 10/2004 | Hinker et al. | 717/137 |
| 6,934,696 | B1* | 8/2005 | Williams | G06N 5/022 |
| | | | | 706/11 |
| 6,993,710 | B1* | 1/2006 | Coad | G06F 8/77 |
| | | | | 715/202 |
| 7,032,210 | B2* | 4/2006 | Alloing | G06F 8/71 |
| | | | | 717/106 |
| 7,284,241 | B2* | 10/2007 | Heishi | G06F 8/425 |
| | | | | 717/141 |
| 7,603,660 | B2* | 10/2009 | Davia | G06F 11/3676 |
| | | | | 717/103 |
| 7,769,704 | B2* | 8/2010 | Marfatia | G06F 8/51 |
| | | | | 706/45 |
| 7,779,387 | B2* | 8/2010 | Harry et al. | 717/113 |
| 7,877,731 | B2* | 1/2011 | Bekelman | 717/123 |
| 8,079,027 | B2* | 12/2011 | Fong | G06F 8/51 |
| | | | | 717/136 |
| 8,181,104 | B1* | 5/2012 | Helfand | G06F 17/2247 |
| | | | | 715/234 |
| 2002/0199168 | A1* | 12/2002 | Namito | G06F 8/30 |
| | | | | 717/107 |
| 2003/0046668 | A1* | 3/2003 | Bowen | G06F 17/5045 |
| | | | | 717/131 |
| 2003/0121000 | A1* | 6/2003 | Cooper | G06F 8/51 |
| | | | | 715/234 |
| 2004/0103405 | A1* | 5/2004 | Vargas | G06F 8/51 |
| | | | | 717/137 |
| 2004/0122791 | A1* | 6/2004 | Sea | G06F 8/51 |
| 2004/0268309 | A1* | 12/2004 | Grover | G06F 8/20 |
| | | | | 717/120 |
| 2005/0060317 | A1* | 3/2005 | Lott | G06Q 10/00 |
| 2005/0125491 | A1* | 6/2005 | Hasegawa | H04L 69/08 |
| | | | | 709/202 |
| 2006/0080645 | A1* | 4/2006 | Miranda et al. | 717/137 |
| 2006/0218374 | A1* | 9/2006 | Ebert | G01S 13/87 |
| | | | | 712/5 |
| 2006/0236224 | A1* | 10/2006 | Kuznetsov | G06F 17/227 |
| | | | | 715/235 |
| 2007/0011654 | A1* | 1/2007 | Opperman | G06F 8/70 |
| | | | | 717/122 |
| 2007/0266378 | A1* | 11/2007 | Fukuda | G06F 8/355 |
| | | | | 717/139 |
| 2007/0283325 | A1* | 12/2007 | Kumar | G06F 8/72 |
| | | | | 717/122 |
| 2008/0016488 | A1* | 1/2008 | Adams | G06F 8/33 |
| | | | | 717/100 |
| 2008/0127127 | A1* | 5/2008 | Chitgupakar | G06F 8/51 |
| | | | | 717/137 |
| 2008/0141011 | A1* | 6/2008 | Zhang | G06F 9/45516 |
| | | | | 712/226 |
| 2009/0024551 | A1* | 1/2009 | Agrawal | G06F 17/30371 |
| | | | | 706/47 |
| 2009/0024930 | A1* | 1/2009 | Kim | G06F 17/30905 |
| | | | | 715/744 |
| 2010/0082954 | A1* | 4/2010 | Lim | G06F 17/50 |
| | | | | 713/1 |
| 2010/0325607 | A1* | 12/2010 | Meijer | G06F 8/447 |
| | | | | 717/106 |

OTHER PUBLICATIONS

Zhenmin Li et al., PR-Miner: Automatically Extracting Implicit Programming Rules and Detecting Violations in Large Software Code, Sep. 5-9, 2005, [Retrieved on Sep. 13, 2016]. Retrieved from the internet: <URL: http://www.cs.kent.edu/~jmaletic/cs63902/Papers/PR-Miner05.pdf> 10 Pages (306-315).*

Umesh Shankar et al., Detecting Format String Vulnerabilities with Type Qualifiers, May 11, 2011, [Retrieved on Sep. 13, 2016]. Retrieved from the internet: <URL: http://www3.cs.stonybrook.edu/~rob/teaching/cse608-fa05/fmtstr-use01.pdf> 16 Pages (1-16).*

"Configuring coding style filter", Research Disclosure, Mason Publications, Hampshire, GB, vol. 451, No. 29, Nov. 2001, pp. 1-2.

"Polystyle User Manual", May 2004, pp. 1-3 retrieved May 28, 2008 http://web.archive.org/web/20040501153610/http://www.polystyle.com/doc/.

* cited by examiner

AUTOMATIC FORMATTING OF COMPUTER PROGRAM SOURCE CODE

FIELD OF THE INVENTION

The present invention relates to a method and system for the automatic formatting of changes made to computer program source code and to a computer program for effecting such formatting.

BACKGROUND OF THE INVENTION

It is common for commercial computer programs to be developed by a team of programmers over a relatively long period of time. During development, the current version of the program source code is generally stored in a code repository from which files or other portions can be extracted for modification and testing. It will frequently arise, in large teams, that code is modified by a person other than the original author.

Source code consists of functional code in a given programming language but also includes non-functional formatting aspects which are essentially a matter of author preference. Different developers have different code formatting preferences, for example on which lines curly braces "{" and "}" should be placed, or how many tabs or spaces should be used for indentation of new lines and how many blank lines should be left between lines of functional code.

Such options may run into the hundreds and various development platforms, such as Eclipse, from the Eclipse Foundation, or Visual Studio (trademark of Microsoft Corporation) provide auto formatting tools that can be configured to a user's formatting preferences. Provided the code is syntactically correct, invoking the tool formats the code in the current file to the configuration specified by the user.

If a programmer opens a file formatted in a different style to their own, edits it and then uses a formatting tool different from that used by the original author, the file can look very different, because different formatting options have been employed. The original author, or anyone else looking at the change history of a file, e.g. to determine how a particular fix was made or what things have changed recently, may then have difficulty monitoring the changes made, which can be a cause of inefficiency and frustration.

Also, using a so called "diff" tool to highlight differences between successive instances of the same code will highlight not only the functional changes but also the formatting changes which will likely be large in number and obscure the significant functional changes. For this reason and generally, it is good practice to attempt to minimise the number of changes made during development of a large computer program.

Of course, for a completely newly written program, one solution is to enforce a given set of coding standards so that everyone uses the same formatting settings, thus ensuring consistency of file format across the code base. This is not possible where a long lived product includes code from previous versions ("legacy code"), which may be written in a number of different programming languages and in a number of formats or styles.

Various approaches to the problems of mixed formats are known in the prior art.

In US Patent Application Publication 2004/0122791 A1 for a "Method and System for Automated Source Code Formatting" (Sea et al. assigned to Hewlett-Packard Company), source code files may be extracted from a store for editing. In the store, the files are stored in a standard format. Once extracted for editing, however, they are reformatted to a programmer's preferred format. After editing they are "re-reformatted" to the standard format and stored back in the repository.

The prior art also includes a source code formatter, known as "Polystyle" (available on the Internet from polystyle.com) which reformats source code to a selected style. The selected style may be an existing style or may be determined from personal examples of the programmer's code. The style for reformatting is then chosen by the programmer.

None of the above prior art offers an automated solution to the problem of how best to format edited versions of earlier developed code in such a way as to minimise formatting changes and hence to facilitate their diagnosis by the originator.

SUMMARY OF THE INVENTION

A first aspect of the present invention provides a method of auto-formatting changes to computer program source code, comprising the computer-implemented steps of:

analyzing the program source code to identify formatting information;

selecting a set of formatting rules for controlling an auto-formatting program to implement auto-formatting consistent with the identified formatting information, wherein the selected rules each specify one of a plurality of formatting options;

in response to editing input from a computer user via a user interface, modifying the program source code;

applying the selected set of formatting rules to control the auto-formatting program to auto-format the modified source code;

and storing the auto-formatted modified source code

One embodiment of the invention provides a method of auto-formatting changes to computer program source code, which program source code is stored in a code repository and comprises a plurality of separately identifiable sections each of which includes non-functional formatting information which differs between at least some of the sections, the method comprising the steps of:

in response to a user input request, extracting a selected source code section from the repository to edit in a temporary store;

automatically determining a set of formatting rules from at least the selected code section, the determined set being one of a plurality of possible sets corresponding to said sections having differing formatting information;

in response to user editing input through a user interface, modifying the temporarily stored source code section;

automatically formatting the edited code section to comply with the determined set of formatting rules;

and storing the edited and formatted code section in the code repository.

A second aspect of the invention provides a system for auto-formatting changes to computer program source code, the system comprising:

a format analyzer for analyzing the program source code to identify formatting information;

means for automatically selecting a set of formatting rules for controlling an auto-formatting program to implement auto-formatting consistent with the identified formatting information, wherein the selected rules each specify one of a plurality of formatting options;

a source code editor, responsive to editing input from a computer user via a user interface, for modifying the program source code;

an auto-formatter for applying the selected set of formatting rules to auto-format the modified source code;

and means for storing the auto-formatted modified source code.

One embodiment of the invention provides a system for auto-formatting changes to computer program source code, which program source code is stored in a code repository and comprises a plurality of separately identifiable sections each of which includes non-functional formatting information which differs between at least some of the sections, the system comprising:

extraction means for extracting a selected source code section from the repository to edit in a temporary store in response to a user input request;

a format analyzer for automatically determining a set of formatting rules from at least the selected code section, the determined set being one of a plurality of possible sets corresponding to said sections having differing formatting information;

editing means for modifying the temporarily stored source code section in response to user editing input through a user interface;

and means for automatically formatting the edited code section to comply with the determined set of formatting rules and returning the edited and formatted code section to the code repository.

The invention also provides a computer program for carrying out a method according to the first aspect of the invention.

The auto-formatting rules to be used for each section are thus selected dynamically in dependence on rules determined from the original version of that section or from a larger body of code including that section, such as a class, a whole file or a selection of files. This results in minimum changes to the code from the original version with consequent reduction in the likelihood of errors and in the ability to identify changes responsible for errors more easily.

Preferably, the step of automatically determining a set of formatting rules determines said rules from the extracted source code section and said automatic formatting step formats the edited code section prior to its storage in the code repository. This allows the user to perform a manual reformat before checking in a file, just to see what format the file will take. However, it would be possible for the format analysis and automatic formatting to take place inside the repository or even the editor without them being made visible to the user.

It should be noted that the source code sections may be complete files, or may be smaller units such as classes or logical functions.

Preferably the automatic determination step determines which of a plurality of optionally variable formatting features are present in the selected code section and which options have been used. If the options have been used consistently, then they can be determined by inspection. If however more than one option has been used for a formatting feature, the most used option is selected as the formatting rule.

In the event that some of said formatting features include common code symbols whose placement depends on their context, the formatting rule for such symbols will need to be determined by reference to the code syntax. Where the section of code is a file, the syntax is preferably determined from the programming language as identified by the file extension or in any one of a number of other known ways.

Where previous code is not being edited but is newly created, it is preferable to auto-format the newly created code sections to comply with a default set of formatting rules. Alternatively, it may be preferable to leave the code as is or to format it according to the most common formatting options used in the product.

To avoid the need to auto format an entire extracted file or section of code, it is possible to compare the original and modified code to identify subsections which have been changed, the auto-formatting step then being applied only to the identified subsections.

Although in its preferred form the invention is utilised in a large scale development system having a code repository from which any of a team of programmers can extract source code for editing, it should be realised that the invention may also be applied to a simple code editor for individual use.

BRIEF DESCRIPTION OF THE DRAWINGS

The present invention is described below in more detail, by way of example, with reference to a preferred embodiment thereof and as illustrated in the accompanying drawings, in which.

DETAILED DESCRIPTION OF THE PREFERRED EMBODIMENT

Figure 1:
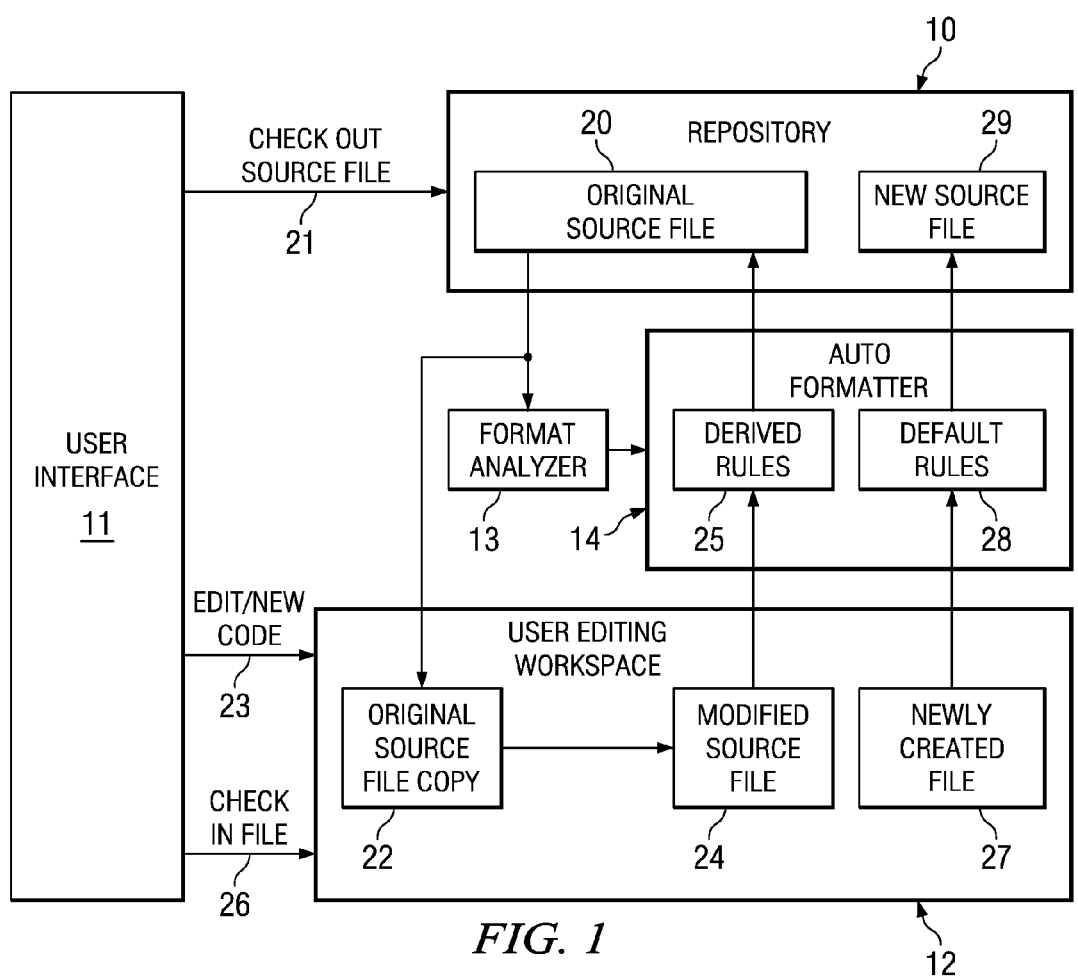
FIG. 1 shows a computer program development system including an auto formatter according to the present invention.

In the system of FIG. 1, program source code under development is stored in a code repository 10, accessible to developers by way of a user interface 11. The other basic components of the system are a user editing workspace 12, a format analyzer 13 and an automatic formatter 14. These components are those necessary to implement the present invention and it will be realised that a complete development system will include other components, not illustrated, such as execution software and processors for executing all of or portions of the program under development and test software for measurement and fault diagnosis.

In overview, the operation of the system is as follows. An original source file 20 is "checked out" of the repository by a developer in response to a request communicated via the user interface 11 over line 21. In fact, one copy 22 of the file is made in editing workspace 12 while another is passed to format analyzer 13. The user edits the file copy 22 in the workspace by entering input via user interface 11 over a line 23. This results in a modified source file 24.

Either before or in parallel with this, the format analyzer 13 analyses the formatting options used in the original source code, which reflect the preferences of the original author(s). The result of this analysis is a set of derived formatting rules 25 which are stored in the auto formatter 14.

When code editing is completed to the satisfaction of the current developer, a further user interface command to check the modified file back into the repository is sent over line 26. This causes the edited code to be auto formatted in accordance with the formatting preferences of the original author(s), irrespective of the current developer's preferences, and returned to the repository 10. The net result is that the original code style is preserved, making it easier to spot differences in the event of subsequent failure on testing.

For simplicity of illustration, the modified and auto formatted code is shown replacing the original source code file. However, it will be realised that, in practice, both versions will be stored at least until the changes are tested and accepted by the programming team. Indeed, many code repositories keep all previous versions of all files (or at least the differences so that an older version can be recreated).

The input line 23 can also be used by the developer to create and enter a completely new source code file, such as file 27, for the first time. When the developer requests on connection 26 that the new file 27 be checked in to the repository 10, it is passed to the auto formatter. However, as it has no previous existence, a default set of formatting rules 28 is applied, as selected by the development team, and a default formatted new source file 29 is stored in the repository.

Figure 2:
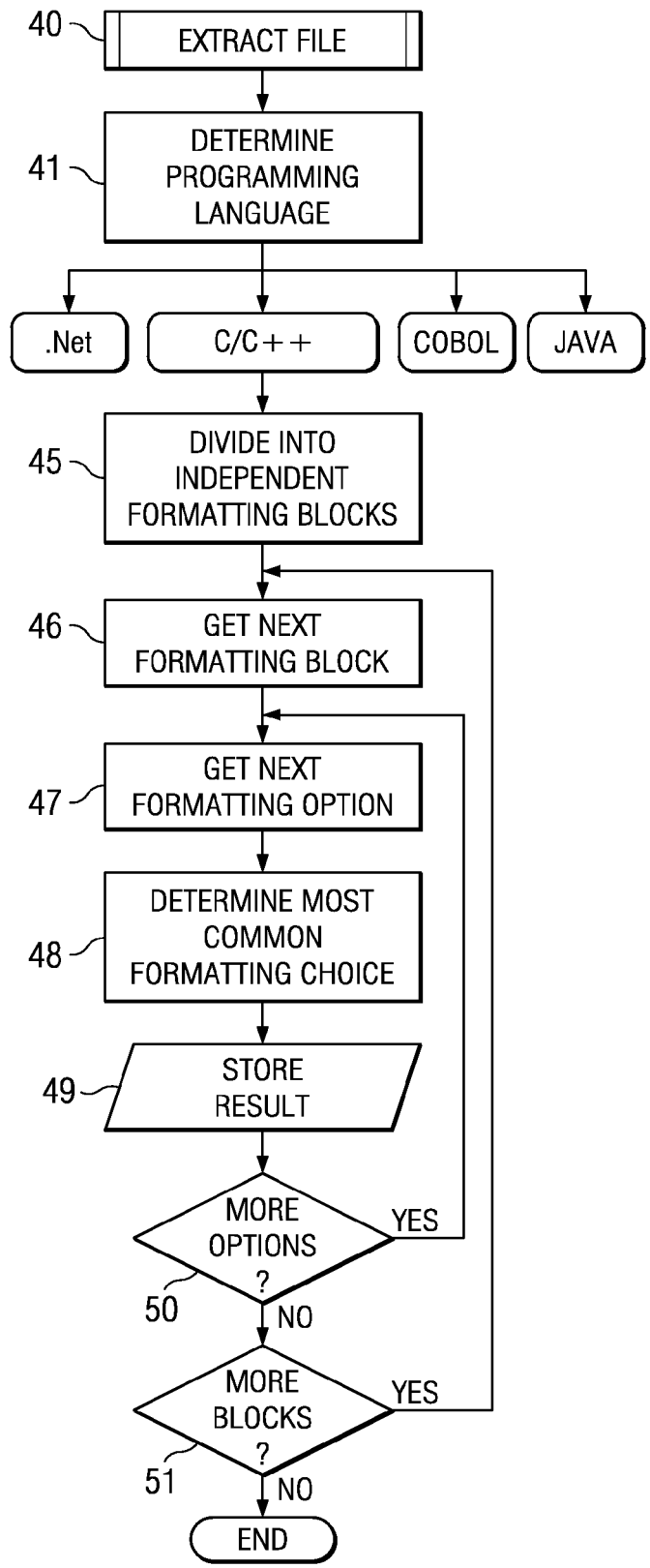
FIG. 2 is a flow diagram illustrating the operation of a format analyzer which is part of the system of FIG. 1.

Thus, in accordance with the invention, old code, which has been edited, preserves its original formatting while new code is formatted in a standard manner for the current product The process of analysing the format of a section of code in the format analyzer 13 is illustrated in the flow diagram of FIG. 2. Firstly, a file (or files) to be edited is extracted in step 40, in response to a check out command from the user on line 21, FIG. 1. Because different programming languages employ different symbolism and syntax, the programming language in which the file was written is determined in step 41. Typical languages shown, by way of example, are ".Net", "C" or "C++", "COBOL" and "Java" ("Java" is a registered trademark of Sun Microsystems, Inc. and ".Net" is available from Microsoft Corporation). Which language is present may be indicated by the file extension, for example ".java" or ".cpp" or by an analysis of a line or two of the code.

In step, 45, the extracted code is divided into independent formatting blocks. In the case of multiple files, the blocks may be the files themselves, including the possibility of a single individual file which would need no division. Alternatively, a file may be divided into classes, functions or even logical sections of code such as declarations, loops etc.

Taking one block at a time (step 46), it is then necessary to go through all the possible formatting options occurring in that block, one at a time, (step 47), and determine for each option, in step 48, which choice the original author made. In case the choice was not made consistently, this step will determine the most common choice. The result for the particular option and block is then stored in step 49.

Next, it is determined whether other options are used in a given block (step 50). If there are, the analysis of steps 47 and 48 is repeated and the results are stored in step 49 to gradually build up a table for the block covering all options used. When all formatting preferences for the block have been determined, the analyzer determines in step 51 whether there are more blocks in the body of extracted code. If there are, the steps 46, 47 and 48 are repeated. When there are no more blocks to consider, the analysis terminates.

Examples of common formatting options are:
Opening brace on same or next line
Spaces or tabs for indentation
Number of spaces/tabs per indentation
Where to allow blank lines
Where to insert new lines
Maximum line length
Line wrapping policy
Comment formatting The most common choices for each of these options, for each block considered, are stored persistently (such as on disk) in order to facilitate restart (rather than in non-persistent storage, e.g. RAM) and are provided as the derived rules 25 to the auto formatter of FIG. 1, whose function is to be described in further detail below.

Before that, an example of how the process of block 48 determines the most common formatting choice for the formatting option of a curly left brace "{" will be described with reference to the flow diagram of FIG. 3.

Block 60 corresponds to block 47 in FIG. 2 for the case of the curly left brace and starts the loop for effectively stepping through the occurrences of this type of brace in the code being analysed. The simple assumption is made that there are only two formatting options, namely, whether or not the brace is preceded entirely by white space back to the beginning of the line of code in which it occurs. This is determined in step 61 and an incremental count started for each possibility. Thus, in step 62, the count is incremented whenever the curly brace is the first meaningful symbol on a line (that is, it has only white space in front of it). Step 63 counts the occurrences of curly braces with preceding symbols in the line. This continues until step 64 determines that there are no more curly left braces in the code being analysed.

Figure 3:
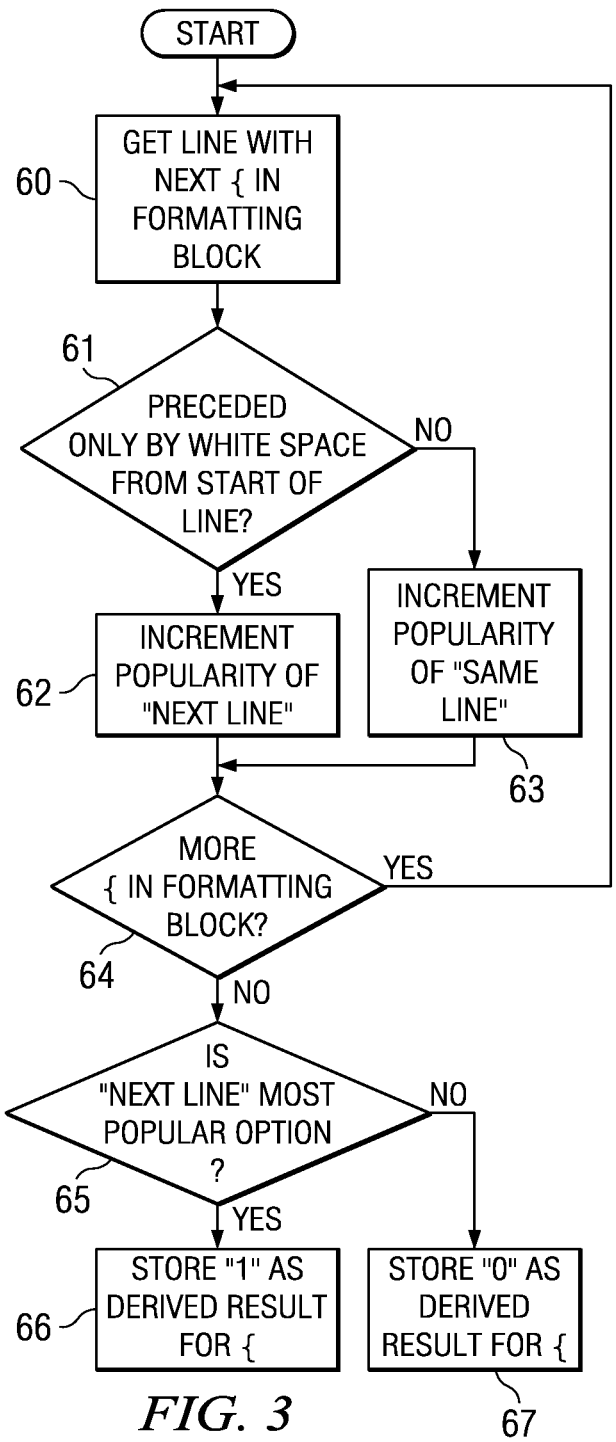
FIG. 3 is a flow diagram illustrating one example of determining the preferred way of formatting curly brackets within the general process of FIG. 2.

FIG. 3 illustrates the most simple and direct approach for ease of understanding. However, a more efficient implementation would determine multiple formatting options while going through the section, e.g. while determining whether braces go on same or next line, the indentation for the brace would be determined at the same time.

Ideally, the author(s) of the code will have used the same convention throughout but this may not have been the case so, in step 65, a determination is made as to which of the two options is the more popular and this one is selected as the formatting option for storage in step 49 of FIG. 2. This is illustrated as a simple binary choice, so that a "1" is stored in step 66, if the preferred option is to start a new line for every curly left brace. If placing new braces on an already part filled line is the preferred option, a "0" is stored in step 67.

An example of two different formatting options for identical function code using curly braces follows:

```
if (myOption) {
   doMyAction( );
}
if (myOption)
{
   doMyAction( );
}
```

In the first example, curly left braces may be preceded by functional code in the same line whereas in the second example, a new line is preferred.

It should be realised that the same symbol, such as the curly brace, can be used in a number of different contexts, depending on the syntax of the programming language, and that not all of these need to be formatted in the same way. For example, in the Java language, a curly left brace can be used in a number of different places:
At the beginning of a class declaration
At the beginning of an anonymous class declaration
At the beginning of a method declaration
At the beginning of an enum declaration
At the beginning of an enum constant body
At the beginning of an annotation type declaration At the beginning of a block
At the beginning of a block in a case statement
At the beginning of a switch statement
At the beginning of an array initializer Given that each of these can be customized either to be put on the same line, on the next line, on the next line indented or on the next line on wrap, it is necessary in this case to know which particular category a given "{" comes under and to treat each as a separate formatting option in carrying out steps 47 and 48 of FIG. 2. For this, and for the correct recognition of each such option in the code to be edited, a knowledge of the language syntax is required.

It will be realised that a similar approach can be used for other formatting options, as listed above, such as whether tabs or spaces should be used for indentation of nested lines of code and the amount of such indentation. To handle indentation, all that is necessary is to go through the white space at the start of each line and count the number of lines using spaces or tabs and also the number of spaces/tabs used. This requires understanding of the syntax to know what is the current level of indentation; i.e. first line is level 1, lines within the first block (e.g. after the first curly brace) are level 2, lines after a second curly brace but before the closing curly brace are level 3 etc. Picking the most common option as with same/next line example of FIG. 3 would complete the process.

A pair of code identical-looking examples are shown below to illustrate some different indentation rules:

```
if (myOption) {
        doMyAction( );
}
if (myOption) {
        doMyAction( );
}
```

Although the above code snippets look identical, the first uses a tab before the doMyAction( ) function call, whereas the second uses 5 spaces. It would be a trivial process for the auto-formatter to analyse the use of tabs or spaces in a given source file and apply the relevant convention to any future code changes.

Policies determining blank line insertion and maximum line length can also be determined in a similar manner.

Figure 4:
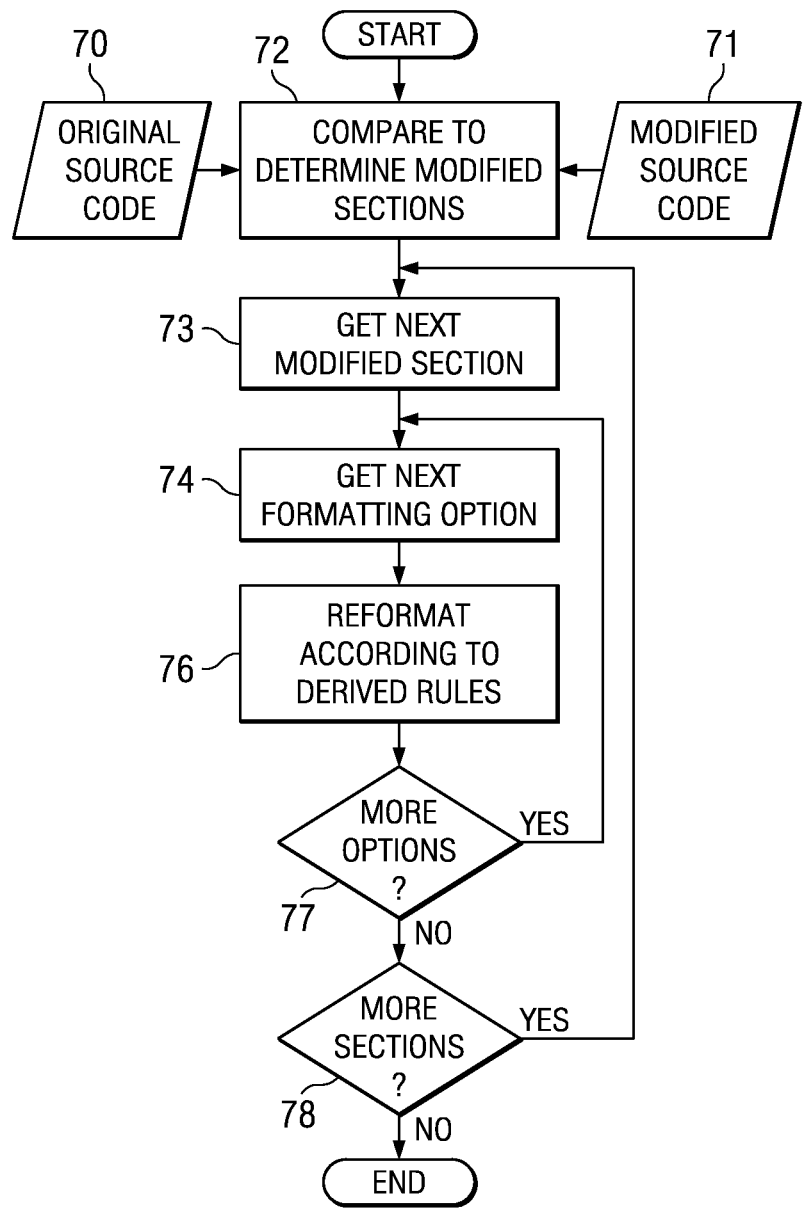
FIG. 4 is a flow diagram illustrating the process of auto formatting modified source code in the system of FIG. 1.

Once the formatting rules have been derived from an original block of code to be edited, the edited code can be auto-formatted in auto formatter 14 as illustrated in the flow diagram of FIG. 4.

Firstly, the original source code 70 is compared with the modified source code 71 in step 72 to identify which sections of the code have been modified. Then, every formatting option within each modified section is successively identified in steps 73 and 74 and reformatted in step 76, according to the derived rules 25. After each occurrence of a particular option is reformatted, a check is made in step 77 for any further options in the section. If there are more options to consider, the process loops back to step 74. If not, step 78 determines whether there are any more modified sections to consider and, if so, loops back to step 73. Only when all sections of modified code and the coding options within them have been reformatted, does the process terminate.

The reformatted file may then be checked back into the repository 10 where it may overwrite the original source file 20 or be stored along with it.

In the examples of FIGS. 1 to 4, the editor used by the user is assumed to be aware of the code repository and hence knows when a more recent version of a file has been extracted. It is therefore aware of when to perform the analysis and which version to compare against when reformatting. With an editor that is not aware of the code repository, the user will have to inform the editor manually when a file has been extracted (i.e. when to perform the analysis) and the editor will have to copy the file to use as the original before any user changes are made (as it will not be able to compare against a version in the repository). This is the situation in which the editor knows nothing about a code repository and is simply used to edit a local file. This is a common scenario and people often use a different application to perform their checkout and checking actions. In this case, the editing (auto formatting) application needs to be made aware when a file has been checked out, i.e. so that the editor application knows to take a copy of the file before a user has made changes to the file. This enables the application to determine which sections of the file have been modified. A repository-aware editor knows when a file has been checked out and can also compare directly against the current version in the repository.

Even when using an editor that is aware of the code repository, it may be useful to cache the original document to prevent unnecessary (or impossible, if offline) network access when comparing against the previous version during the reformat. This is to limit network traffic or to allow formatting to occur when the user does not have connectivity to the repository. This is useful when the user wishes to perform an auto format but not check in. When performing a reformat, the editor can determine the modified sections by comparing the edited file against the current version in the repository and then do the format on those sections. This requires network traffic between the editor and the repository (if on different machines, which is likely). If the user is disconnected from the network and has not taken a copy of the file before editing, the editor cannot determine the modified sections.

It should also be realised that instead of or as well as performing the process in the editor when the user wishes to reformat the code manually, this process could be applied by a code repository upon check-in of a file (i.e. automatically without requiring any user interaction or even user knowledge). The entire process would be done in this single action rather than analysis on extract and reformat later, as all required information is available at this time.

The invention claimed is:

1. A method of auto-formatting changes to computer program source code, comprising the computer-implemented steps of:
    analyzing the program source code to identify formatting information;
    selecting a set of formatting rules for controlling an auto-formatting program to implement auto-formatting according to the identified formatting information, wherein the selected rules each specify one of a plurality of formatting options;
    in response to editing input from a computer user via a user interface, modifying the program source code;
    applying the selected set of formatting rules to control the auto-formatting program to auto-format the modified source code; and
    storing the auto-formatted modified source code.

2. The method according to claim 1, wherein the program source code is stored in a code repository and comprises a plurality of sections which each includes non-functional formatting information, wherein the formatting information differs between at least some of the sections, and wherein the method further comprises:

in response to a user input request, extracting a selected source code section from the repository and saving the extracted source code section in a temporary store for editing; and performing the analyzing, selecting, modifying and applying steps on the extracted source code section in the temporary store.

3. The method as claimed in claim 2, wherein the step of selecting a set of formatting rules is based on the analyzing step performed on the extracted source code section, and wherein the step of applying the selected set of formatting rules to auto-format the modified source code section is followed by storing the modified and auto-formatted source code section in the code repository.

4. The method as claimed in claim 1, wherein the analyzing step determines which of a plurality of optionally variable formatting features are present in the program source code and which options have been used.

5. The method as claimed in claim 4 in which, if more than one option has been used for a formatting feature, a most used option is selected as the formatting rule.

6. The method as claimed in claim 4 in which some of said formatting features include common code symbols whose placement depends on context of the common code symbols, the formatting rule for such symbols being determined by reference to a syntax of the program source code.

7. The method as claimed in claim 6 wherein, if the section of code is a file, the syntax is determined from the programming language as identified by the file extension.

8. The method as claimed in claim 1 in which newly created code sections are auto-formatted to comply with a default set of formatting rules.

9. The method as claimed in claim 1, which includes the further step of comparing the program source code and modified source code to identify subsections which have been changed, the auto-formatting step being applied only to the identified subsections.

10. A data processing system for auto-formatting changes to computer program source code, the data processing system comprising:

a format analyzer for analyzing the program source code to identify formatting information;

means for automatically selecting a set of formatting rules for controlling an auto-formatting program to implement auto-formatting according to the identified formatting information, wherein the selected rules each specify one of a plurality of formatting options;

a source code editor stored in a memory, responsive to editing input from a computer user via a user interface, for modifying the program source code;

an auto-formatter for applying the selected set of formatting rules to auto-format the modified source code; and means for storing the auto-formatted modified source code.

11. The data processing system according to claim 10, for auto-formatting changes to computer program source code that is stored in a code repository and comprises a plurality of separately identifiable sections which each include non-functional formatting information, wherein the formatting information differs between at least some of the sections, the system further comprising:

means for extracting a selected source code section from the repository and for saving the extracted source code section in a temporary store for editing.

12. The data processing system as claimed in claim 11, wherein the format analyzer automatically determines a set of formatting rules from the extracted source code section and said auto-formatting program is arranged to format the modified code section prior to its return to the code repository.

13. The data processing system as claimed in claim 12, wherein the format analyzer is arranged to determine which of a plurality of optionally variable formatting features are present in the selected code section and which options have been used.

14. The data processing system as claimed in claim 13, wherein, if more than one option has been used for a formatting feature, the format analyzer selects the most used option as the formatting rule.

15. The data processing system as claimed in claim 14, wherein some of said formatting features include common code symbols whose placement depends on context of the common code symbols, the formatting rule for such symbols being determined by reference to a syntax of the program source code.

16. The data processing system as claimed in claim 15, wherein, if the section of code is a file, the syntax is determined from the programming language as identified by the file extension.

17. The data processing system as claimed in claim 16 in which the auto-formatter is arranged to automatically format newly created code sections to comply with a default set of formatting rules.

18. The data processing system as claimed in claim 17, further comprising means for comparing the program source code and modified source code to identify subsections which have been changed, and for providing only the identified subsections to the auto-formatter.

19. A non-transitory computer readable device comprising a computer program for auto-formatting changes to source code, the program comprising instructions which, when executed in a data processing system, causes the data processing system to carry out the steps of:

analyzing the program source code to identify formatting information;

selecting a set of formatting rules for controlling an auto-formatting program to implement auto-formatting according to the identified formatting information, wherein the selected rules each specify one of a plurality of formatting options;

in response to editing input from a computer user via a user interface, modifying the program source code;

applying the selected set of formatting rules to control the auto-formatting program to auto-format the modified source code; and storing the auto-formatted modified source code.

* * * * *